INVENTOR.
Robert K. Hopkins

HIS ATTORNEYS

Nov. 24, 1964  R. K. HOPKINS  3,157,919
APPARATUS FOR PRODUCING IMPROVED INGOT METAL
Filed May 13, 1960  4 Sheets-Sheet 3

INVENTOR.
Robert K. Hopkins
BY Green, McCallister & Miller
HIS ATTORNEYS

Nov. 24, 1964    R. K. HOPKINS    3,157,919
APPARATUS FOR PRODUCING IMPROVED INGOT METAL
Filed May 13, 1960    4 Sheets-Sheet 4
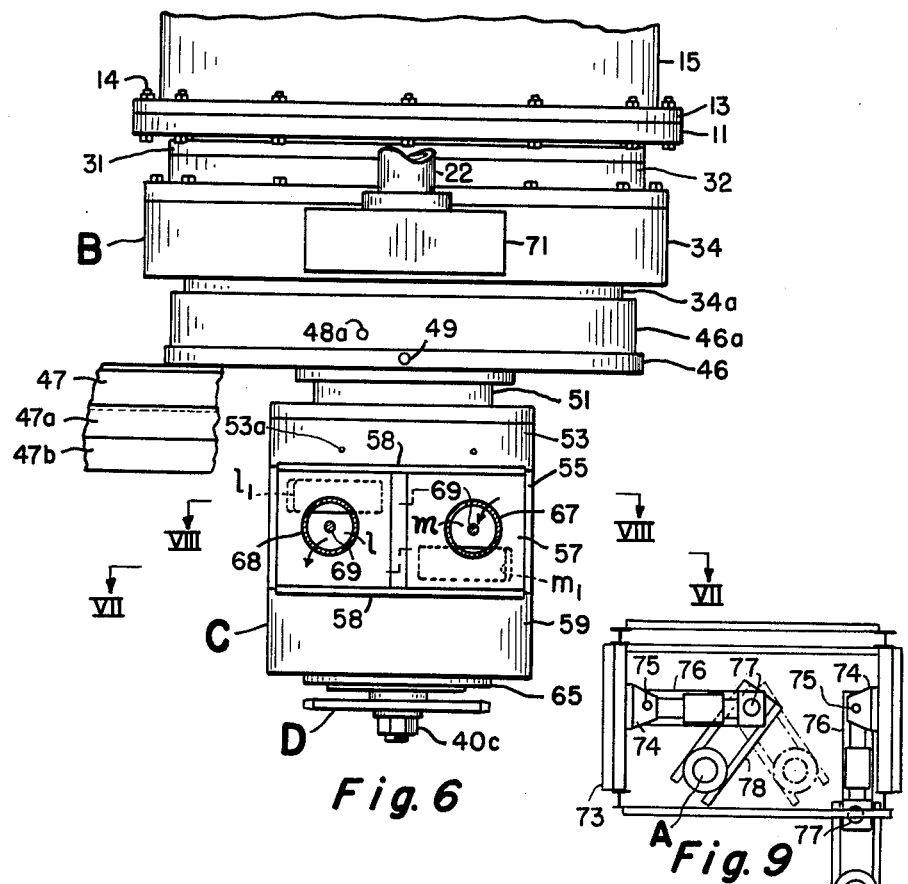
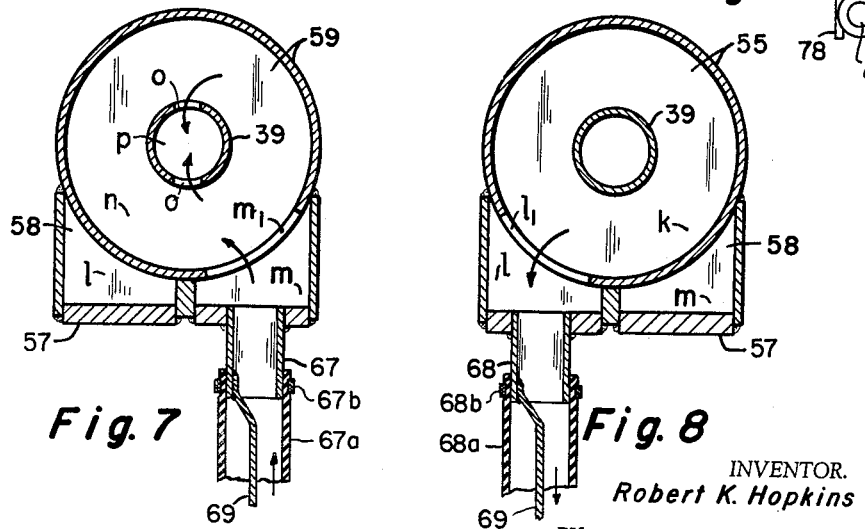
INVENTOR.
Robert K. Hopkins
BY Green, McCallister & Miller
HIS ATTORNEYS

United States Patent Office 3,157,919
Patented Nov. 24, 1964

3,157,919
APPARATUS FOR PRODUCING IMPROVED
INGOT METAL
Robert K. Hopkins, West New Brighton, N.Y., assignor to Firth Sterling, Inc., Pittsburgh, Pa., a corporation of Pennsylvania
Filed May 13, 1960, Ser. No. 28,877
9 Claims. (Cl. 22—57)

This invention relates to rotating material-processing apparatus, to apparatus of such a type that may be swung from one position to another, and particularly to apparatus for rotating an ingot mold and energizing metal material therein during such rotation. A phase of the invention relates to apparatus for electrically-energizing the material in a mold during rotation of the mold. Another phase relates to apparatus for cooling the mold as well as its supporting means during the processing of material therein. It is particularly applicable to the electric arc-melting-casting of quality metal alloys, such as those of steel, as by a consumable electrode method.

This application is a continuation-in-part of my application Serial No. 858,719 of December 10, 1959, entitled "Method and Apparatus for Producing Improved Alloy Metal" and pertains particularly to apparatus suitable for carrying out procedure therein disclosed.

In carrying out procedure for making high quality alloys or products that employs relative rotation of an ingot mold with respect to a melting electrode, such as a consumable electrode used in providing metal for the ingot, I have found that it is important to provide means or apparatus for efficiently conducting current of one potential to the mold during its rotation, so that a properly controlled arc may be formed and maintained between metal in the ingot and an electrode of opposite electrical potential. In an operation of my procedure, direct current may be supplied by bus bars from a direct current source, for example, it may be supplied at 30 volts and up to about 18,000 amperes. Due to rotation of the mold, flexible electrical connections are unsuitable, and due to the relatively high current required in an electrode melting operation, sparking and wear and tear are incident to the employment of sliding contacts, as represented by commutator, slip ring, and other types of connections. Excessive and variable voltage drops, such as across the rotatable electrical contacts, result in a loss of power, excessive heating, and give rise to difficulties in accurately controlling the operation. Accurate control of an arc-melting operation requires a substantially accurate control of voltage and current and this cannot be accomplished where, for example, a variable, relatively large voltage drop occurs in electrical contacts, since such a voltage drop will not necessarily vary in a straight line with an increase or decrease of current supplied.

It has thus been an object of my invention to provide new and improved apparatus for rotatably processing material in a mold, also for supporting and handling the mold;

Another object has been to meet various adverse factors heretofore encountered in providing a suitable rotative type of electric current connection and to develop a better type of rotative connection that will be more efficient and effective in its utilization and relatively inexpensive from the standpoint of maintenance;

Another object of my invention has been to devise apparatus which will provide a practical approach to the problem of supplying relative high current to a rotating ingot mold;

A further object of my invention has been to devise an improved arrangement for cooling the mold and its supporting apparatus;

A further object has been to devise apparatus for accomplishing a desired rotation of an ingot mold and for supplying current thereto from a stationary current source, such as bus bars, which will eliminate sparking and frictional wear contacts and will make possible an effective cooling of conductor surfaces to maintain them at a temperature that is better suited for current conduction;

A still further object of my invention has been to provide a rotating mold apparatus embodying therein a fluid conductor and means for cooling the fluid conductor and the apparatus during the operation of the apparatus;

These and other objects of my invention will appear from the illustrations, the specification and the claims.

In the drawings,

FIGURE 6 is a fragmental vertical side view in elevation on the scale of and taken at right angles to FIGURE 1; this figure particularly illustrates the construction of lower portions of the apparatus of FIGURE 1, including the rotating mold table, actuating means therefor, and cooling means for electrical connections to a stationary support for the mold table;

FIGURE 7 is an enlarged horizontal section taken along the line VII—VII of FIGURE 6, particularly illustrating current connections to the stationary support, as well as inlet means for cooling fluid, such as water;

FIGURE 8 is a horizontal section on the scale of FIGURE 7 and taken along the line VIII—VIII of FIGURE 6; this view particularly illustrates fluid outlet means for the apparatus; and FIGURE 9 is a greatly reduced, somewhat diagrammatic plan showing how the mold and its supporting apparatus of FIGURE 1 may be swung from one position in the plant to another.

Figure 1:
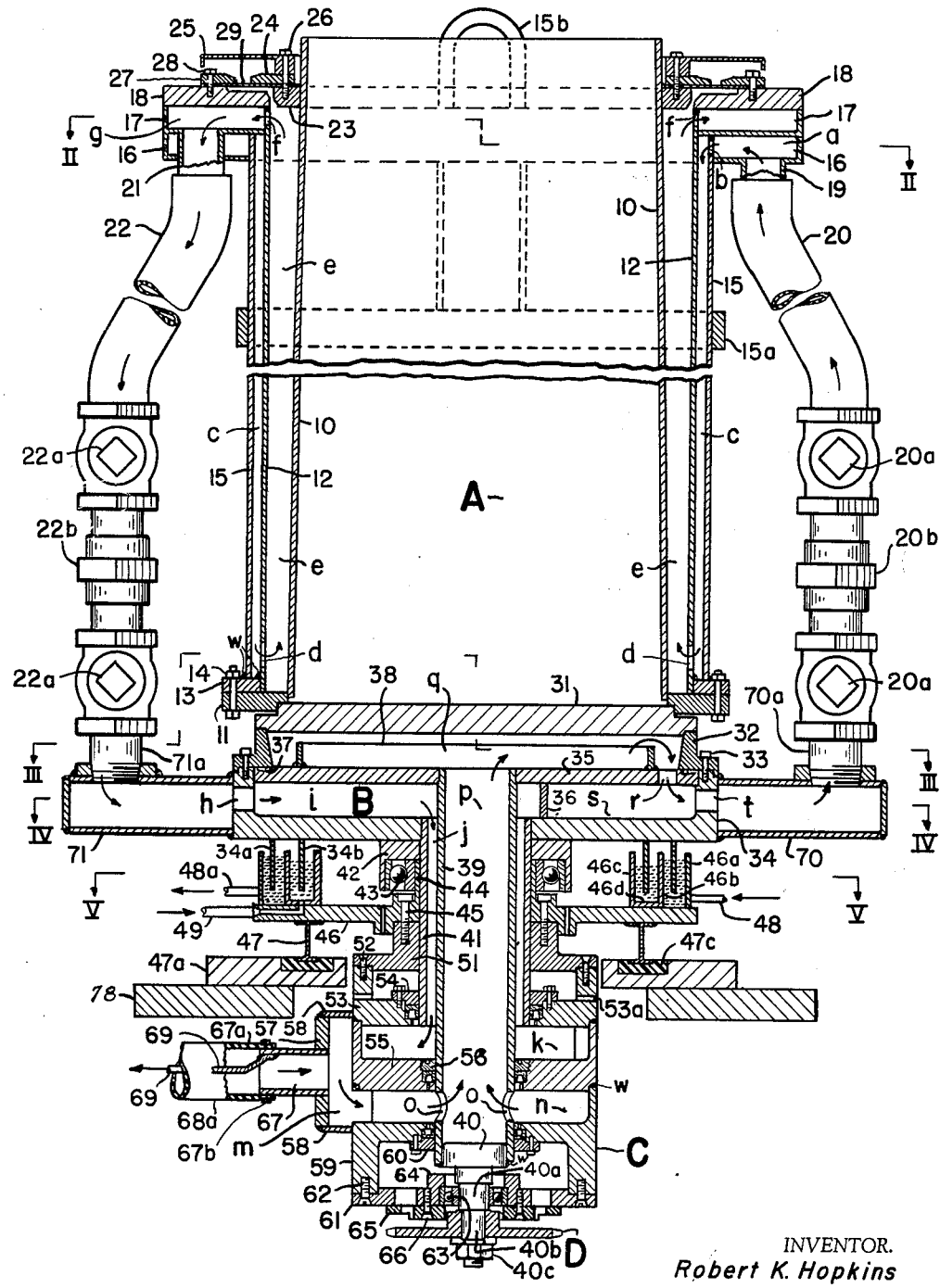
FIGURE 1 is a vertical section of apparatus of my invention showing a mold supported thereby and partially broken away through its shell walls; this figure particularly illustrates details of my apparatus from the standpoint of means for conducting electric current of one potential to, for cooling, and for rotating an ingot mold.
Figure 2:
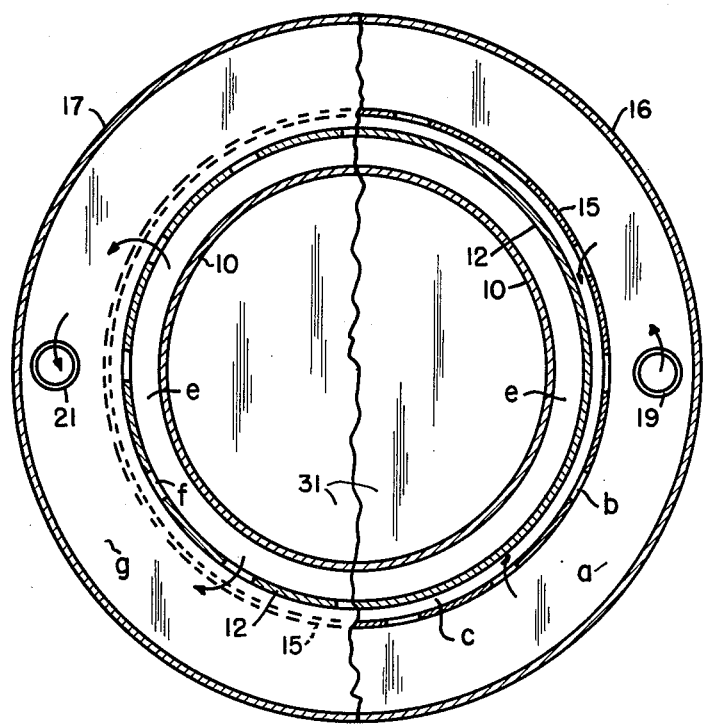
FIGURE 2 is a top horizontal section on the scale of and taken along the line II—II of FIGURE 1.

In my previously-mentioned co-pending application, I have illustrated how a consumable electrode may be employed with a mold in accomplishing an ingot-melting-casting operation. As customary, one potential side of the bus bar source of current will be connected to the electrode. The other potential side will be connected to the ingot material, itself, by means such as shown in FIGURE 1. In FIGURES 1 and 2 of my co-pending application, I have indicated that mold support apparatus may be carried on a swing arm to not only provide for moving the mold to a cooperating position with respect to either one of two electrodes, but also for providing a desired alignment of the mold with the one electrode with which it is cooperating. In the present application, I show swing frames (see FIGURE 9) having a pair of swing parts 76 and 78. The part 78 has extending fork portions receiving a mold A and its supporting apparatus; this structure makes possible a greater swing of the molds from one position to another in the plant. In this connection, I can now, when making a larger ingot, use-up one consumable electrode and then, without substantially interrupting the operation, swing the mold into position with a second electrode (that is connected and ready to operate) to complete the melting operation. I have also found that it is desirable to start the melting operation by substantially centering an electrode or group of electrodes with respect to the mold and to then off-center them during the major portion of the operation, and finally, to again center them in the final hot-topping of the formed ingot. The swing table herein disclosed thus enables the support apparatus, including the mold, to be moved, pivoted or swung in an arcuate path with respect to the electrode or electrode group being employed, as well as to be moved out of a melting position, after an ingot has been formed, to facilitate the upward removal of the mold in stripping the ingot.

Referring particularly to FIGURE 1 of the drawing, I have generally indicated an ingot mold A, a rotating mold table B, a stationary support and cooling-fluid supply housing C, and an actuating or driving means D for rotating a central drive shaft of the rotating table. The mold A is removably positioned on a bottom end closure plate, wall or support member 31, so that after an ingot has been formed, it may be lifted by the engagement of hooks of a conventional plant hoist or crane with its opposed pair of lift eye-lugs 15b. The entire mold assembly A may be thus lifted, after fluid coupling 20b and 22b have been disconnected, to "strip" a formed ingot.

A bottom closure ring 11 has an inner, offset portion to fit with and rest upon a similarly offset, outer-peripheral edge portion of the bottom closure plate member 31, and at its inner periphery forms a close fit with the lower end of an inner shell wall 10 of the mold to close-off spacing between inner and intermediate shell walls 10 and 12 and define an inner cooling fluid-circulating jacket chamber e therealong. An adjacent closure ring 13 is removably secured, as by bolts 14, to the lower and larger bottom ring 11 and carries lower end portions of the intermediate shell wall 12 and an outer shell wall 15 of the mold in a weld-secured relation thereon to define an outer cooling-fluid jacket chamber c therebetween.

The outer shell wall 15 is shown provided with an outer, circular, reinforcing band 15a secured thereabout. At its upper end, the outer shell wall 15 carries an annular, cooling-fluid inlet chest or header 16. An annular, warmed-fluid outlet chest or header 17 is secured to and rests upon the chest 16 and is carried by the intermediate shell wall 12 and the outer shell wall 15. A top closure plate or member 18 is secured to enclose and seal-off the upper fluid chest or header 17.

Figure 3:
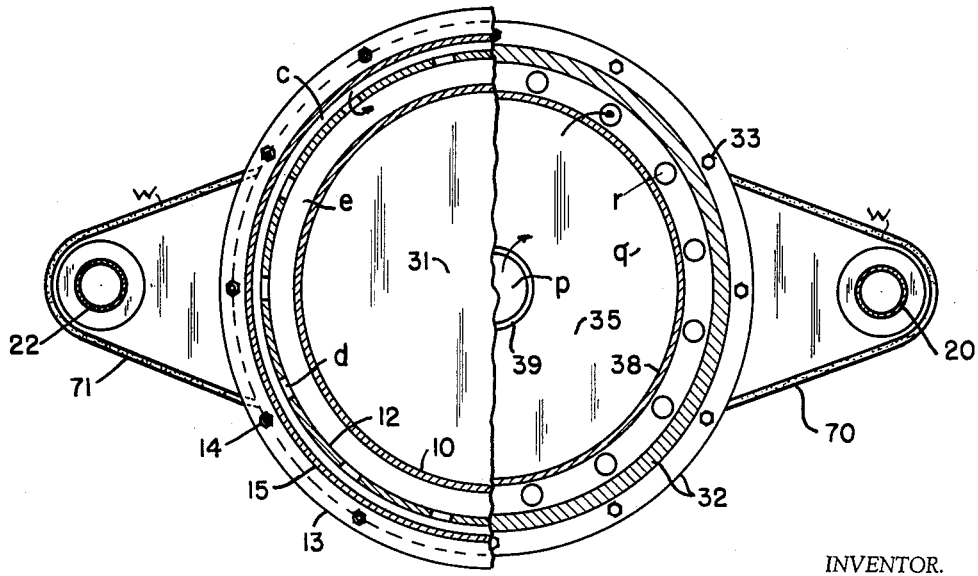
FIGURE 3 is a somewhat central horizontal section on the scale of and taken along the line III—III of FIGURE 1.

Refering particularly to FIGURES 1, 2, and 3, cooling fluid, such as water, is supplied to an inlet fitting 19 of the lower chest or header 16 by a hose or conduit connection 20. A table-mounted, side chest 70 supplies cooling fluid from its outlet fitting 70a, through shut-off valves 20a and a coupling 20b, to the hose 20. On the other side of the mold A, an outlet fitting 21 extends from the upper header or chest 17, through the lower chest 16, to deliver warmed fluid to a hose or conduit 22. The hose 22 conducts the warmed fluid through shut-off valves 22a and coupling 22b to an inlet fitting 71a of a second, table-mounted side chest 71.

The inner shell wall 10, near its upper open mouth end portion, securely carries a radially-outwardly projecting annular, side-mounting flange 23 in a spaced relationship with the top closure member 18. An inner spacer ring part 24 rests on the flange 23 and carries a radially-outwardly-projecting upper shield or cover part 25 that is removably secured thereon. Bolts 26 extend through a hub portion of the cover 25, through the ring part 24 and a closure plate member 29 into the mounting flange 23. An outer spacer ring part 27 is adapted to rest upon an upper face of the closure member 18 and to, with the inner ring part 24, carry the closure plate 29. It will be noted that the outer ring part 27 is secured in position to the closure member 18 by threaded bolts 28. The closure plate member 29 closes off the upper portion of the fluid chamber e that is defined by the inner shell wall 10 and the intermediate shell wall 12. The part 25 serves as a shield in a spaced relation above the closure plate 29, the outer spacer ring 27 and its bolts 28.

It will be apparent that easy access can be had to the chamber e and that the shell wall 10 may be easily dismounted with respect to the other shell walls 12 and 15 by means of the structure above-described. Flow of cooling fluid is indicated by the arrows in FIGURES 1, 2 and 3. It passes from chambers a to the chest 16, through ports b in the upper portion of the outer shell wall 15, downwardly along the outer jacket chamber spacing c, through ports d in the bottom portion of the intermediate shell wall 12, up along the inner jacket chamber e, through ports f in the top portion of the intermediate shell wall 12, and into the chamber g of the outlet chest or header 17. The couplings 20b and 22b enables shell walls of the mold A to be removed as a unit from the supporting closure plate member 31 when a formed ingot is to be stripped. Before the couplings 20b and 22b are disconnected, the shut-off valves 20a and 22a are closed so as to prevent a loss of cooling fluid.

Figure 4:
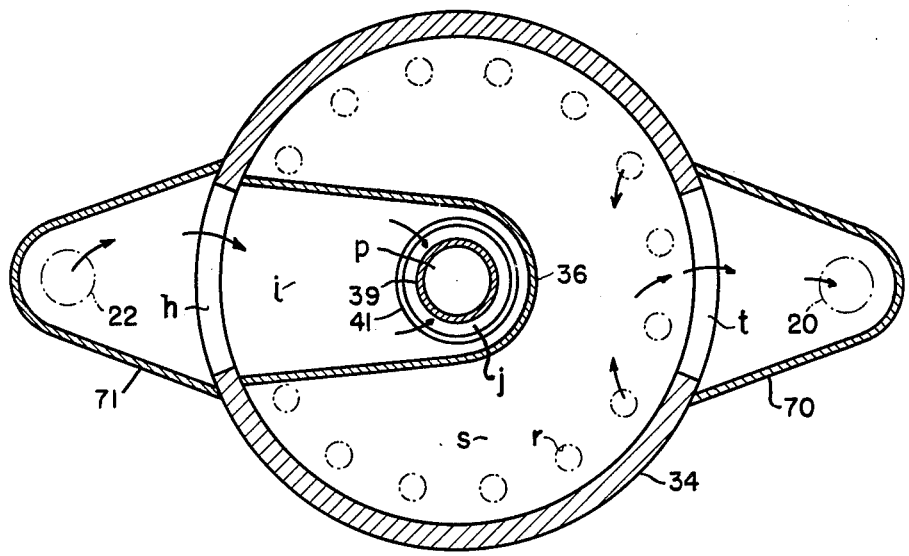
FIGURE 4 is a somewhat central horizontal section taken along the line IV—IV of FIGURE 1 and on the scale of such figure.

The rotating table B has a bottom and end wall part or member 34 and an interfitting top closure wall part or member 35 that are securely fit together to define a cooling fluid-receiving spacing, chamber or water box therebetween. As shown particularly in FIGURES 1 and 4, a vertical baffle 36 divides the spacing between the members 34 and 35 into a cooling-fluid inlet chamber or jacket space s and an outlet chamber i.

It will be noted that cooling fluid enters through ports o in the bottom end portion of a hollow, central, sleeve-drive shaft 39 and flows upwardly along its vertical chamber p, into an upper jacket space or chamber q of the rotating table B, and over the edge of an annular, central baffle ring 38 that is secured to project upwardly from the member 35. In this manner, the underside of the bottom closure plate member 31 is continuously cooled. The cooling fluid leaves the chamber q (see FIGURES 1, 3 and 4) by flowing downwardly through vertical ports r in the top wall member 35, into the chamber s, and out through a side port t into the table-mounted side chest 70.

An upwardly-projecting annular support ring 32 interfits with under-cut outer peripheral edge portions of the bottom closure plate member 31 to carry the ingot mold A in a supported relationship thereon over the jacket or chamber q. The mounting base portion of the supporting ring 32 is removably secured to the table member 34 and in fluid-sealed with respect to the top table member 35 by an inset-mounted, annular, O-ring gasket 37.

The hollow drive shaft 39 which is centrally secured to and supports the rotatable table B, at its lower end, is shown provided with an extension stud shaft 40 projecting downwardly therefrom and securely fit therewithin. The extension stud shaft 40 has a reduced bearing portion 40a and a further reduced portion 40b on which drive sprocket D is fixedly secured by a nut and washer assembly 40c mounted on its threaded end.

Figure 5:
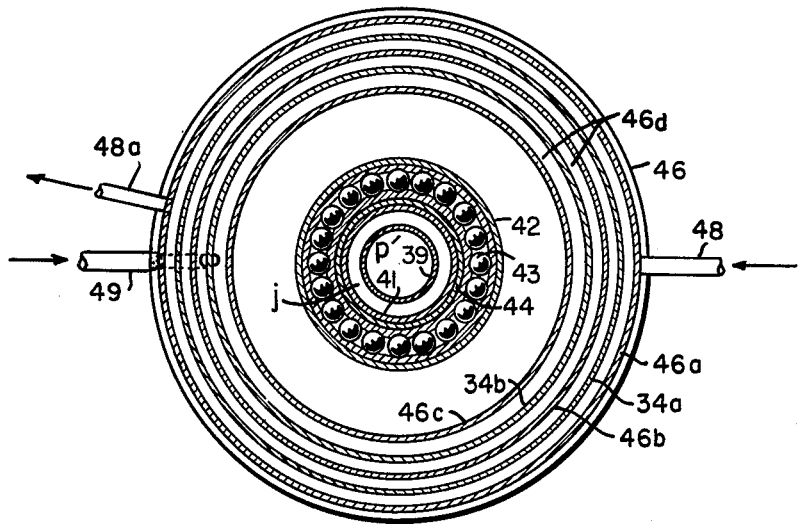
FIGURE 5 is a horizontal section on the scale of and taken along the line V—V of FIGURE 1; it particularly illustrates details of the construction of rotatable conductor means employed for the rotating table shown in FIGURE 1.

An outer sleeve, shaft or tube 41 is secured at its upper end to the lower rotating table member 34 and is shown positioned in a radially-outwardly spaced-apart relation with the main or central drive shaft 39. The sleeve shaft 41 projects downwardly from an open central portion of the bottom table part 34. The hollow shafts 39 and 41 thus define a down-flow jacket spacing or chamber *j* therebetween. An annular bearing block 42 is secured to project downwardly from the part 34 and to carry a combined roller and sleeve bearing assembly 43 and 44 (see FIGURES 1 and 5). A stationary or secondary support table 46 is journaled with respect to the bearing 43, 44, and is removably secured to an annular, angle-shaped, support ring member 51 by bolts 45. The ring member 51 rotatably receives the sleeve 41. Radially spaced-apart fin portions 46a, 46b and 46c project upwardly from the stationary or secondary table 46 and define a pair of fluid-carrying troughs therewith.

It will be noted that an inner trough, defined by the fins 46b and 46c, has a bottom closure member 46d to provide a conductor trough for a suitable conductor fluid or liquid such as mercury. An inlet portion 49 is connected to a passageway in the table 46 and is open through a port in the member 46d to keep the fluid in the conductor trough at a proper level. A pair of downwardly-projecting, annular, flanges 34a and 34b are securely positioned in a radially-spaced-apart relation from the bottom of the rotating table member 34 to project within the two troughs defined by the fins 46a, 46b and 46c in a spaced relationship therewithin. The inner flange 34b is a conductor flange that is adapted to rotate within the conductor fluid of the inner trough to continuously supply electric current from the stationary table 46 to the rotating table B and thus, to the mold A and the material which is being electrically processed, as by arc melting, within such mold.

The outer trough defined by the fins 46a and 46b is employed as a sealing and cooling trough and in this connection may be filled with a cooling fluid such as water. In this manner, the outer trough and its associated flange 34a not only seal-off the conductor fluid carried by the inner trough from the atmosphere, but may be employed to keep such fluid at a suitable operating temperature. For example, mercury has a boiling point of about 357° C. and it is important to maintain the mercury in a liquid condition within the inner or conductor trough under high temperature conditions at which an electric arc-melting operation is being effected on the material, such as alloy metal, within the ingot mold A. In FIGURE 1, I have shown a cooling fluid inlet 48 and a cooling fluid outlet 48a to the outer trough.

The secondary or stationary table 46 is provided with a pair of downwardly projecting support beam parts or members 47 whose upper flanges are secured thereto. It will be noted that the support beams 47 have their bottom flanges inset within insulating blocks 47c, such as of hard resin or plastic material, that are carried by a circular, top platform or frame member 47a. In accordance with my concept, the forked or bifurcated end portions of the swing frame 78 (see also FIGURE 9), may be slid into an under-carrying position with the platform member 47a to carry the complete apparatus assembly and, when desired, swing it from one position in the plant to another.

In FIGURE 9, I have shown an enclosing stationary frame structure 73, and a pair of swing frames pivotally mounted thereon. Each swing frame has a pair of swing parts 76 and 78; the part 76 is shown pivoted at 75 to a mount 74 that projects from the frame 73, and the part 78 is shown pivoted at 77 on a forward end portion of the part 76. In this figure, the left hand swing frame is shown by full and dotted lines as positioning a mold A in one of two alternate melting positions (beneath electrodes above such positions), and the right hand swing frame is shown as extended to position another mold A in an ingo stripping position.

The ring member 51 (see FIGURE 1) carries an angle-shaped, stationary, annular bottom part or member 53 by means of inset bolts 52. Side ports 53a extend through the member 53 to vent an inner chamber defined with the sleeve 41 to the atmosphere. A gland mounting 54 is bolted to the part 53 and has a U-shaped sealing gasket to provide a sealing gland between the stationary part 53 and the rotating sleeve 41. A stationary, annular shelf part or member 55 of U or angle-shape has an end wall which is inset into the part 53 and is secured in a sealed-off relation therewith to define a lower outlet chamber or chest *k* (see FIGURES 1 and 8) with the wall of the inner or sleeve drive shaft 39. A side-positioned, vertical, header or chest wall 57 is secured by a horizontal closure wall or side chest member 58 to project radially-outwardly from the part 53 and an inverted U-shaped part or member 59. The part 59 has an inner gland 60 carrying a U-shaped gasket to seal it off with respect to the lower end of the rotating shaft 39.

It will be noted that an inlet nipple or fitting 67 for the main supply of cooling fluid (see also FIGURE 7) projects outwardly from the chest wall 57 and introduces cooling fluid supplied from a suitable cooling source by means of a conduit or hose 67a of non-conducting material, such as resin or rubber. As shown particularly in FIGURE 7, the hose 67a may be clamped in position on the inlet fitting 67 by a band 67b. A braided electric current-carrying cable 69, for example of bronze or copper alloy is shown as positioned to extend substantially centrally along the hose 67a, so that it is both insulated and cooled in its connection to the source of current. The end of the cable 69 is brazed to the fitting 67 to conduct current thereto. At its other end, the cable 69 may be mounted in the same manner on a fitting of a water circulating header to which conventional bus bars are electrically connected, as by a coupling (not shown). It will be noted that parts, such as 67, 68, 57, 58, 53, 52, 51, 45, 46, 46d, 46c, 46b, 34a, 34, 33, 32, etc., are preferably made of a metal having efficient electric current-carrying properties, such as bronze or a hard copper alloy.

The side spacing or jacketing defined by the parts 57 and 58 has, as shown particularly in FIGURES 7 and 8, a central partition which separates it into two chests or chambers, one of which *m* is a fluid-inlet chest, and the other of which *l* is a fluid-outlet chest. The fluid outlet chest also has a metal fitting 68 over which a conduit or hose 68a (similar to hose 67a) is secured by a clamping band 68b. The hose 68a may, at its other end, be connected to a water circulating header (not shown). Like the hose 67a, the hose 68a also carries a braided electric cable 69 that is brazed to the end of its fitting 68. In this way, parallel, water-cooled cables 69 may be connected between a source of electric current (such as direct current) and the secondary table 46 of the apparatus.

Cooling fluid, such as water, at a suitable temperature, for example 110° F. and about 35 pounds of pressure, may thus be introduced to the apparatus through the inlet fitting 67, the inlet chest *m*, side port $m_1$ (see FIGURES 1 and 7), to a central inlet chest or chamber *n* defined by the parts 55 and 39, through side or radial ports *o* in the sleeve shaft 39, to flow upwardly along the vertical chamber *p* of the shaft 39. Warmed fluid, at for example 140° F., moves downwardly in a return flow along the chamber *j*, into a central outlet chest or chamber *k* (see FIGURES 1 and 8), out through a port $l_1$ in the part 55, into the outlet chest *l*, and then through the fitting 68. In this manner, the stationary table C, the rotating table B and the mold A may be cooled throughout the operation of the apparatus by a constantly circulating fluid. As applied temperature of about 110° F. has been found particularly suitable, in that condensation is prevented and an efficient cooling action is constantly effected.

The part 59 (see FIGURE 1) is closed-off at its open mouth bottom by a bottom part or member 61. Inset bolts 62 removably mount the member 61 in position. A sleeve and ball bearing assembly 63 journals the reduced portion 40a of the stud shaft 40 with respect to a center hub portion 64 of the member 61. A face plate 65 is secured on the member 61 by inset bolts or screws 66 to hold the bearing assembly 63 in position.

What I claim is:

1. In an improved apparatus for electrically-melting metals such as high quality alloys and forming a cast metal ingot therefrom within an ingot mold, employing a rotating table for carrying the ingot mold, employing a secondary table below the rotating table for rotatably supporting it, and employing means for rotating the rotating table; an outer peripheral side wall about the ingot mold defining a mold body having a metal melting and casting chamber therein and cooling-fluid-jacketing thereabout, a bottom closure member carried on an upper portion of the rotating table to removably-liftably receive said mold body and support and close-off the melting and casting chamber therein at a bottom end of said body, fluid inlet and outlet chests carried by said rotating table, and removably-coupled and valved fluid-flow connections between said fluid inlet and outlet chests and said cooling-fluid-jacketing of said mold body, whereby said mold body and a formed cast metal ingot therein may be lifted-off said bottom closure member and the rotating table for stripping the metal ingot.

2. In an improved apparatus for electrically-melting metals such as high quality alloys and forming a cast metal ingot therefrom within an ingot mold, employing a rotating table for carrying the ingot mold, employing a secondary table below the rotating table for rotatably supporting it, and employing means for rotating the rotating table; an outer peripheral side wall about the ingot mold defining a mold body having a metal melting and casting chamber therein and cooling-fluid jacketing thereabout, a bottom closure member carried on an upper portion of the rotating table to removably-liftably receive said mold body and support and close-off the melting and casting chamber therein at a bottom end of said body, fluid inlet and outlet chests carried by said rotating table, and removably-coupled and valved fluid-flow connections between said fluid inlet and outlet chests and said cooling-fluid-jacketing of said mold body, whereby said mold body and a formed cast metal ingot therein may be lifted-off said bottom closure member and the rotating table for stripping the metal ingot, at least one electrical connection to the secondary table for supplying electric current thereto, an annular inner trough positioned to extend upwardly on the secondary table, a temperature-sensitive electrical conductor fluid positioned within said inner trough, said inner trough being defined by inner and outer annular flange walls, an annular outer trough positioned on the secondary table and extending upwardly therefrom about said inner trough for carrying cooling-fluid and defined by the outer flange wall of said inner trough and by a further annular outer flange wall, a pair of annular inner and outer flanges extending downwardly from the rotating table in a transversely-spaced relation with each other, said inner flange being a conductor flange and extending into an electrically-conductive relation with said conductor fluid in said inner trough for electrically-connecting the rotating table with the secondary table during the rotation of the rotating table, the rotating table having electrically-conductive portions between said conductor flange and said bottom closure member for supplying electrical current to said mold body and the metal within the melting and casting chamber therein, a cooling fluid inlet and a warmed fluid outlet connected to said outer trough for supplying and circulating cooling-fluid in an upwardly-open relationship therealong to maintain said conductor fluid in a liquid condition within said inner trough, and said outer flange extending within the circulating cooling fluid being supplied to said outer trough, whereby the conductor fluid is sealed-off from the atmosphere by the circulating-cooling fluid of said outer trough and is maintained at an effective operating temperature for supplying electric current from the secondary table through the rotating table and said bottom closure member to said mold body during the rotation of the rotating table.

3. In an improved apparatus for electrically-melting metals such as high quality alloys and forming a cast metal ingot therefrom within an ingot mold, employing a rotating table for carrying the ingot mold, employing means for rotating the rotating table, employing a secondary table below the rotating table for rotatably supporting it, and employing means for rotating the rotating table; an outer peripheral side wall about the ingot mold defining a mold body having a metal melting and casting chamber therein; said side wall having an inner shell wall, an intermediate shell wall and an outer shell wall in a spaced relationship with each other and defining inner and outer side chambers therebetween that provide dual cooling-fluid-jacketing for said side wall; upper and lower ring means cooperating with said shell walls for closing-off opposite ends of said inner and outer side chambers, a pair of cooling-fluid headers about an upper portion of said mold body and constituting a cooling-fluid inlet header connected for fluid-flow to the upper end portion of one of said side chambers and a cooling-fluid outlet header connected for fluid-flow to the upper end portion of the other of said side chambers, means connecting lower end portions of said side chambers for fluid-flow therebetween, a bottom closure member carried on an upper portion of the rotating table to removably-receive said lower ring means and support and close-off the melting and casting chamber therein at a bottom end of said mold body, a pair of fluid chests carried by the rotating table and constituting inlet and outlet chests, a pair of fluid couplings, a fluid-flow conduit connected through one of said couplings between said inlet chest and said inlet header to supply cooling-fluid to said header, a fluid-flow conduit connected through the other of said couplings between said outlet chest and said outlet header to exhaust warmed-fluid from said outlet header, and valve means operatively positioned with respect to said conduits for shutting-off fluid flow therealong when said couplings are disconnected, whereby said mold body and a formed cast metal ingot therein may be lifted-off said bottom closure member and the rotating table for stripping the ingot.

4. An improved apparatus as defined in claim 3 wherein, an inlet and an outlet fluid conduit are connected to the secondary table and through it to the rotating table for supplying cooling-fluid to said inlet chest and for exhausting warmed-fluid from said outlet chest, means electrically-connects the secondary table through the rotating table to said mold body, and electrical conductor cables are positioned to extend internally in a spaced relation along the inside of each of said conduits and are electrically connected to the secondary table at their forward ends, so that said electrical conductor cables will be cooled by the flow of cooling-fluid into said inlet chest and by the flow of warmed-fluid from said outlet chest.

5. An improved apparatus as defined in claim 3 wherein, the rotating and secondary tables are electrical current-conductive, at least one electrical conductor is connected to the secondary table for supplying electric current thereto, an annular inner trough is positioned on the secondary table, a temperature-sensitive electric conductor fluid is carried within said inner trough, said inner trough is defined by an inner flange wall and an outer flange wall, an annular outer trough is positioned on the secondary table about said inner trough for carrying cooling-fluid and is defined by the outer flange wall of said inner trough and by a further outer flange wall, a pair of annular inner and outer flanges project downwardly from the rotating table in a spaced relation with each other, said inner flange is a conductor flange and extends into an electrically-conductive relationship with said conductor fluid in said first trough, a cooling fluid inlet and a warmed fluid outlet are connected to said outer trough for supplying and circulating cooling fluid in an open relationship therealong to maintain said conductor fluid in a liquid condition within said inner trough, and said outer flange extends within the circulating cooling fluid being supplied to said outer trough, whereby the conductor fluid is sealed-off from the atmosphere by the circulating cooling fluid of said outer trough and is maintained at an effective operating temperature for supplying electric current from the secondary table through the rotating table to said mold body during rotation of the rotating table.

6. An improved apparatus as defined in claim 3 wherein, the upper portion of the rotating table has a transverse table wall, a supporting ring is secured to project upwardly from said table wall and cooperate with outer edge portions of said bottom closure member to support and define a cooling-fluid jacket chamber along the underside of said bottom closure member, an inner sleeve shaft is open at its upper end to said cooling-fluid jacket chamber and projects downwardly-centrally from said rotating table to rotatably-carry the rotating table within the secondary table, said inner sleeve shaft defines a vertical cooling-fluid inlet chamber therealong, a cooling fluid inlet is connected to a lower end portion of said inner sleeve shaft to supply cooling fluid through said vertical inlet chamber to said jacket chamber for cooling the underside of said bottom closure member, and passageway means connects said jacket chamber with said fluid inlet chest for supplying cooling fluid thereto.

7. An improved apparatus as defined in claim 6 wherein, a baffle ring projects upwardly from said table wall within said jacket chamber, and said passageway means extends through said table wall transversely-outwardly of said baffle ring.

8. In an improved apparatus for electrically-melting metals such as high quality alloys and forming a cast metal ingot therefrom within an ingot mold, employing a rotating table for carrying the ingot mold, employing means for rotating the rotating table, employing a secondary table below the rotating table for rotatably supporting it, and employing means for rotating the rotating table: an outer peripheral side wall about the ingot mold defining a mold body having a metal melting and casting chamber therein; said side wall having an inner shell wall, an intermediate shell wall and an outer shell wall in a spaced relationship with each other and defining inner and outer side chambers therebetween that provide dual cooling-fluid-jacketing for said side wall; upper and lower ring means cooperating with said shell walls for closing-off opposite ends of said inner and outer side chambers, a pair of cooling-fluid headers about an upper portion of said mold body and constituting a cooling-fluid inlet header connected for fluid-flow to the upper end portion of one of said side chambers and a cooling-fluid outlet header connected for fluid-flow to the upper end portion of the other of said side chambers, means connecting lower end portions of said side chambers for fluid-flow therebetween, a bottom closure member carried on an upper portion of the rotating table to removably-receive said lower ring means and support and close-off the melting and casting chamber therein at a bottom end of said mold body, a pair of fluid chests carried by the rotating table and constituting inlet and outlet chests, a pair of fluid couplings, a fluid-flow conduit connected through one of said couplings between said inlet chest and said inlet header to supply cooling-fluid to said header, a fluid-flow conduit connected through the other of said couplings between said outlet chest and said outlet header to exhaust warmed-fluid from said outlet header, valve means operatively positioned with respect to said conduits for shutting-off fluid flow therealong when said couplings are disconnected, whereby said mold body and a formed cast metal ingot therein may be lifted-off said bottom closure member and the rotating table for stripping the ingot, an inner sleeve shaft defining a fluid inlet chamber along its inside portion and projecting centrally-downwardly from the rotating table in a journaled relation within the secondary table and having its inlet chamber connected at an upper end portion thereof to said inlet chest to supply cooling fluid thereto, a cooling-fluid inlet connected to the inlet chamber of said inner sleeve shaft at its lower end portion for supplying cooling fluid upwardly therealong, an outer sleeve shaft projecting downwardly from the rotating table in a radially-spaced relation about said inner sleeve shaft and defining a fluid outlet chamber along the outside portion of said inner sleeve shaft, said outer sleeve shaft having its outlet chamber connected at its upper end portion to said outlet chest, and a warmed-fluid outlet connected to the outlet chamber of said outer sleeve shaft at its lower end to exhaust warmed-fluid downwardly along said outlet chamber.

9. An improved apparatus as defined in claim 8 wherein bearing means is carried by the secondary table in a vertically-spaced relation therealong for rotatably journaling said inner and outer sleeve shafts therein.

References Cited in the file of this patent

UNITED STATES PATENTS

| 1,053,563 | Bocuze | Feb. 18, 1913 |
| 1,354,286 | De Bats | Sept. 28, 1920 |
| 1,691,369 | Baker | Nov. 13, 1928 |
| 2,405,254 | Hopkins | Aug. 6, 1946 |
| 2,727,936 | Boyer | Dec. 20, 1955 |
| 2,899,677 | Bredtschneider et al. | Aug. 11, 1959 |

FOREIGN PATENTS

| 713,506 | Great Britain | Aug. 11, 1954 |

UNITED STATES PATENT OFFICE
CERTIFICATE OF CORRECTION

Patent No. 3,157,919                                        November 24, 1964

Robert K. Hopkins

It is hereby certified that error appears in the above numbered patent requiring correction and that the said Letters Patent should read as corrected below.

Column 3, lines 31 and 32, for "coupling" read -- couplings --; column 4, line 57, after "jacket" insert -- spacing --; line 60, for "in" read -- is --; column 6, line 66, for "As" read -- An --.

Signed and sealed this 20th day of April 1965.

(SEAL)
Attest:

ERNEST W. SWIDER                                    EDWARD J. BRENNER
Attesting Officer                                       Commissioner of Patents